(12) United States Patent
Kurani et al.

(10) Patent No.: US 12,093,927 B1
(45) Date of Patent: *Sep. 17, 2024

(54) MULTI CHANNEL PURCHASING OF INTEROPERABLE MOBILE WALLET

(71) Applicant: Wells Fargo Bank, N.A., San Francisco, CA (US)

(72) Inventors: Ashish Bhoopen Kurani, Burlingame, CA (US); Melissa Lowry, San Francisco, CA (US); Stephen M. Ellis, Tahoe City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,246

(22) Filed: Jan. 30, 2023

Related U.S. Application Data

(63) Continuation of application No. 17/157,454, filed on Jan. 25, 2021, now Pat. No. 11,568,391, which is a continuation of application No. 16/206,654, filed on Nov. 30, 2018, now Pat. No. 10,902,414, which is a continuation of application No. 15/391,253, filed on Dec. 27, 2016, now Pat. No. 10,346,834, which is a continuation of application No. 14/090,229, filed on Nov. 26, 2013, now Pat. No. 9,916,577.

(51) Int. Cl.
| | |
|---|---|
| *G06Q 20/36* | (2012.01) |
| *G06Q 10/083* | (2023.01) |
| *G06Q 20/20* | (2012.01) |
| *G06Q 20/32* | (2012.01) |
| *G06Q 30/0241* | (2023.01) |

(52) U.S. Cl.
CPC .......... *G06Q 20/36* (2013.01); *G06Q 10/083* (2013.01); *G06Q 20/20* (2013.01); *G06Q 20/32* (2013.01); *G06Q 20/3221* (2013.01); *G06Q 20/3223* (2013.01); *G06Q 20/326* (2020.05); *G06Q 20/3274* (2013.01); *G06Q 20/3276* (2013.01); *G06Q 30/0241* (2013.01)

(58) Field of Classification Search
None
See application file for complete search history.

(56) References Cited

U.S. PATENT DOCUMENTS

| | | | |
|---|---|---|---|
| 7,593,873 | B1 | 9/2009 | Oakes, III |
| 8,600,835 | B1 | 12/2013 | Lueck |
| 10,410,177 | B2 | 9/2019 | Causey et al. |
| 2006/0161474 | A1 | 7/2006 | Diamond et al. |

(Continued)

*Primary Examiner* — Joseph W. King
(74) *Attorney, Agent, or Firm* — Foley & Lardner LLP

(57) ABSTRACT

A computer-implemented includes: causing a first interface to be displayed by a mobile device that includes a first selection option; causing a second interface to be displayed by the mobile device that displays an image capture interface; receiving an image from the mobile device based on receiving a second user selection of an image capture function element displayed on the second interface; determining a product associated with a code; receiving a third user selection of the product and a product purchase option associated with the product; transferring a payment for the product to a merchant associated with the product from an account based on information associated with the merchant and the product purchase option; and causing a third interface to be displayed by the mobile device that includes a purchase confirmation that includes order details regarding the product and the product purchase option.

20 Claims, 13 Drawing Sheets

(56) References Cited

U.S. PATENT DOCUMENTS

| | | |
|---|---|---|
| 2010/0082444 A1 | 4/2010 | Lin et al. |
| 2011/0196732 A1 | 8/2011 | Schueller et al. |
| 2012/0209749 A1 | 8/2012 | Hammad et al. |
| 2012/0290472 A1 | 11/2012 | Mullen et al. |
| 2013/0110678 A1 | 5/2013 | Vigier et al. |
| 2013/0191213 A1 | 7/2013 | Beck et al. |
| 2013/0262315 A1 | 10/2013 | Hruska |
| 2014/0025457 A1 | 1/2014 | Martinez et al. |
| 2014/0081729 A1 | 3/2014 | Ocher |
| 2014/0207559 A1 | 7/2014 | McCord et al. |
| 2014/0358656 A1 | 12/2014 | Poole et al. |
| 2015/0134449 A1 | 5/2015 | Gorelov et al. |
| 2015/0178757 A1 | 6/2015 | Moshal |

Fig. 10

Bank Name | Sign Off

Confirmation # 12-3456-A — 1001

Google Nexus 4 — 902
$ 249.00 — 903

Ship To
Johnny Appleseed — 909
113 Main Street — 905
Springfield, MA 01234 — 911

Delivery date: — 1012
10/10/2013

Continue — 1020

Confirmation

Bank Name | Sign Off

Confirm Purchase — 901

BEST BUY — 901
Google Nexus 4 — 902
$ 249.00 — 903

Pay From
Wells Fargo Debit - 1234 — 905
Edit — 911

Ship To
Johnny Appleseed — 909
113 Main Street
Springfield, MA 01234

Edit — 913

Cancel | Purchase — 915

Confirm Purchase

900

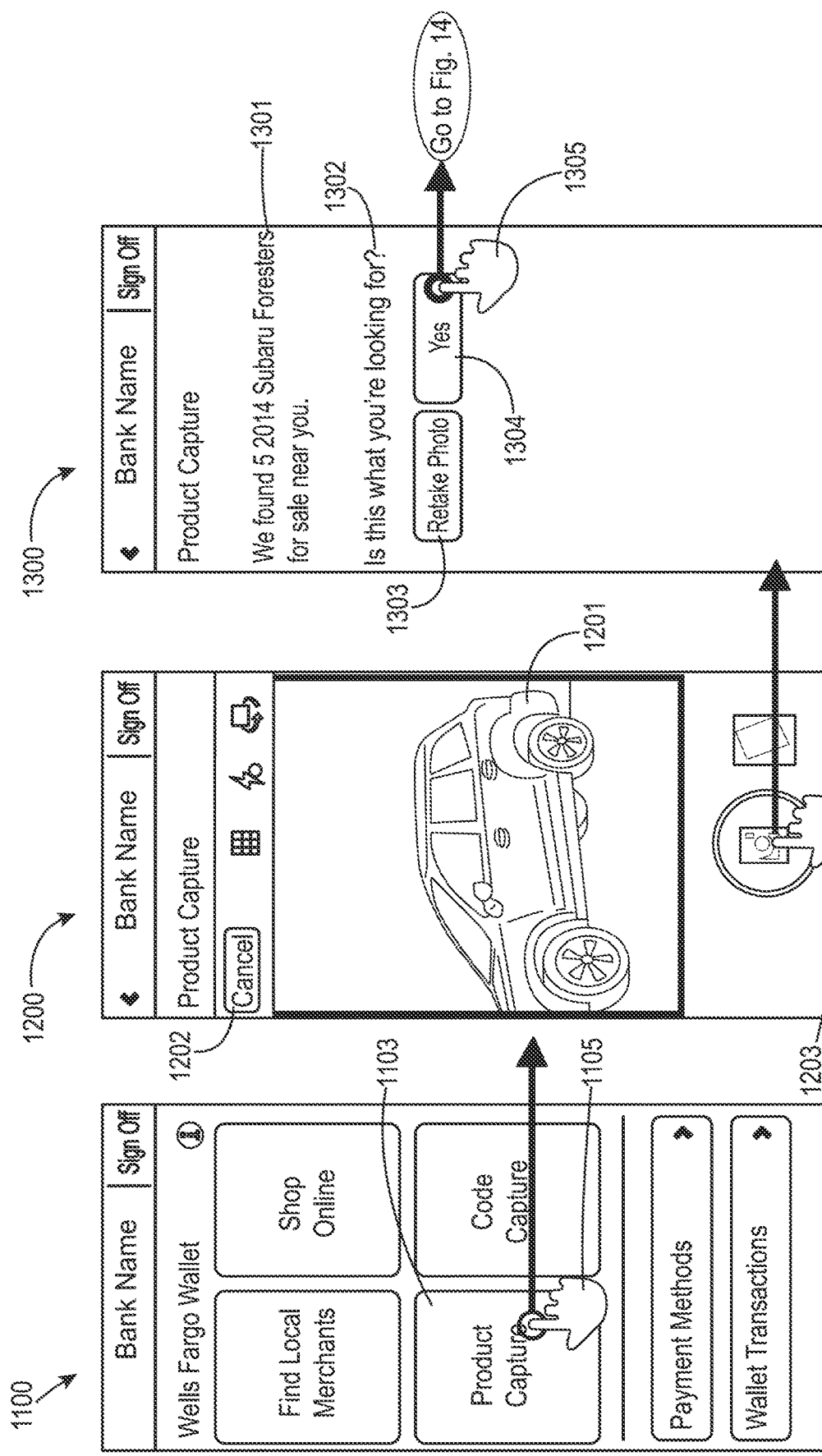

Fig. 14 Product Place Comparison

- Bank Name | Sign Off
- Product Capture — 1401
- 2014 Subaru Forester
- Mooreville Subaru, 1456 Main Street, Townville, CA 12345 — $21,345
- Vallejo Subaru, 1456 Main Street, Townville, CA 12345 — $22,345
- Marin Subaru, 1456 Main Street, Townville, CA 12345 — $26,345
- San Mateo Subaru, 1456 Main Street, Townville, CA 12345 — $27,345
- San Francisco Subaru, 1456 Main Street — $28,345

Fig. 15 Confirm Purchase

- Bank Name | Sign Off
- Confirm Purchase — 1501
- 2014 Subaru Forester
- $ 21,345 — 1502
- IN STOCK
- Option 1, Option 2, Option 3, Option 4, Option 5, Option 6, Option 7, Option 8, Option 9, Option 10, Option 11, Option 12, Option 13 — 1503
- Cancel — 1504
- Buy Now — 1505
- 1506

Fig. 16 Confirmation

- Bank Name | Sign Off
- Confirmation # 12-3456-A — 1601
- 2014 Subaru Forester — 1602
- $ 21,345 — 1603
- Pick up:
  Mooreville Subaru
  1456 Main Street
  Townville, CA 12345 — 1604
- Available date: — 1605
- 10/10/2013
- Continue — 1606

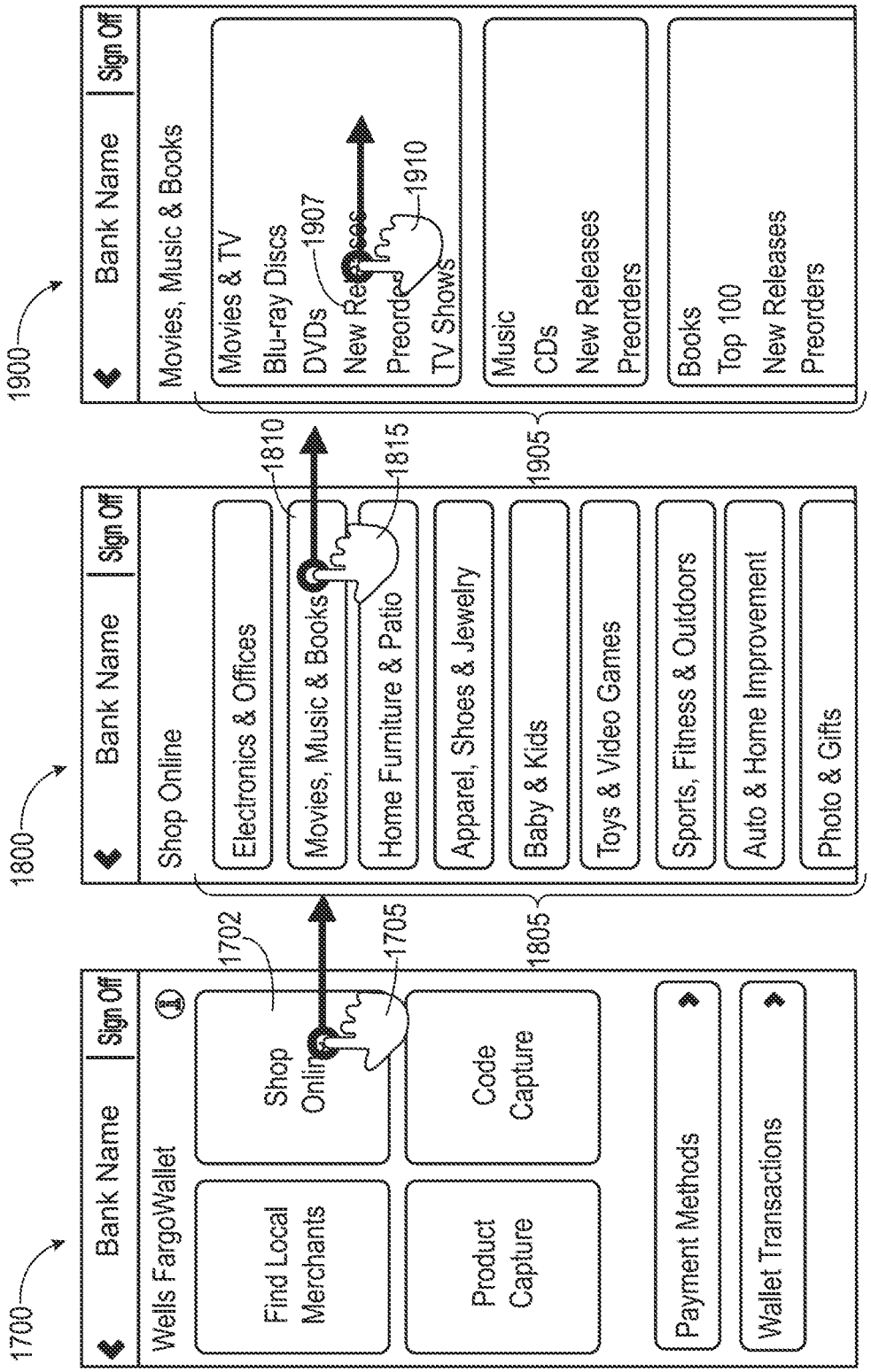

Fig. 20 — Shop Online-Products

Fig. 21 — Confirm Purchase

Fig. 22 — Confirmation

MULTI CHANNEL PURCHASING OF INTEROPERABLE MOBILE WALLET

CROSS-REFERENCE TO RELATED APPLICATIONS

The present Application is a continuation of, and claims priority to, U.S. patent application Ser. No. 17/157,454, entitled "MULTI CHANNEL PURCHASING OF INTEROPERABLE MOBILE WALLET," filed Jan. 25, 2021, which is a continuation of, and claims priority to, U.S. patent application Ser. No. 16/206,654, entitled "MULTI CHANNEL PURCHASING OF INTEROPERABLE MOBILE WALLET," filed on Nov. 30, 2018, which is continuation of, and claims priority to, U.S. patent application Ser. No. 15/391,253, entitled "MULTI CHANNEL PURCHASING OF INTEROPERABLE MOBILE WALLET," filed on Dec. 27, 2016, which is a continuation of, and claims priority to, U.S. patent application Ser. No. 14/090,229, entitled "MULTI CHANNEL PURCHASING FOR INTEROPERABLE MOBILE WALLET," filed on Nov. 26, 2013, all of which are incorporated herein by reference in their entireties and for all purposes.

FIELD

The present disclosure relates generally to the field of methods systems that use mobile devices to purchase products and services. More specifically, the present disclosure relates to systems and methods for enabling individuals to use their electronic devices to purchase products, receive refunds and services at any location.

BACKGROUND

Payments for products and services are often completed using credit cards, debit cards, checks or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless Internet connection. A person may wish to make payments to or receive refunds from merchants or other individuals using these mobile devices. At various merchant locations, individuals wait in long lines in order to purchase items causing costly delays and high labor costs. Likewise, a person may wish to transfer funds to or receive funds from other individuals using their mobile devices. Enhanced systems and methods of facilitating such transactions would be desirable.

SUMMARY

One embodiment includes a computer-implemented method. The method includes authenticating, by a mobile wallet computer system, a mobile device of a user. The method further includes receiving, by the mobile wallet computer system, an image from the mobile device of the user, the image comprising a picture of a product. The method also includes sending, by the mobile wallet computer system, the image to an image search engine to identify the product displayed in the picture. The method additionally includes assigning, by the mobile wallet computer system, a product identifier to the identified product from the picture. The method also includes requesting, by the mobile wallet computer system, a confirmation from the user that the assigned product identifier corresponds to the identified product. The method further includes upon receiving confirmation from the user, generating a product comparison screen including a plurality of merchants and purchase options for a product corresponding to the product identifier. The method further includes receiving, by the mobile wallet computer system, a user input selection of a merchant and product purchase option from the mobile device of the user. The method also includes transferring, by the mobile wallet computer system, a payment for the product to the selected merchant from an account held by the user based on the merchant and product purchase option information received from the mobile device of the user.

One embodiment includes a mobile wallet comprising a processor coupled to machine readable storage media having instructions stored therein that, when executed by the processor, cause the processor to receive an image from the mobile device of the user, the image comprising a picture of a product. The instructions also cause the processor to send the image to an image search engine to identify the product displayed in the picture. The instructions further cause the processor to assign a product identifier to the identified product from the picture. The instructions also cause the processor to request a confirmation from the user that the assigned product identifier corresponds to the identified product. The instructions further cause the processor to upon receiving confirmation from the user, generate a product comparison screen including a plurality of merchants and purchase options for a product corresponding to the product identifier. The instructions also cause the processor to receive a user input selection of a merchant and product purchase options for the product from the mobile device of the user. The instructions further cause the processor to transfer payment for the product to the selected merchant from an account held by the user based on the merchant and product purchase option information received from the mobile device of the user.

BRIEF DESCRIPTION OF THE DRAWINGS

FIG. 9 is an illustration of a user interface that confirms the product purchase information, according to an exemplary embodiment.

FIG. 10 is an illustration of a user interface that provides the user with the details regarding the purchase, according to an exemplary embodiment.

FIG. 11 is an illustration of a mobile wallet home screen display where the option to capture an image of the product is selected by the user, according to an exemplary embodiment.

FIG. 12 is an illustration of a user interface that may allow the user to capture an image of a desired product, according to an exemplary embodiment.

FIG. 13 is an illustration of a user interface that may identify the image of the captured product, according to an exemplary embodiment.

FIG. 14 is an illustration of a user interface that provides the option to select a desired product, according to an exemplary embodiment.

FIG. 15 is an illustration of a user interface that provides various options relating to the product purchase, according to an exemplary embodiment.

FIG. 16 is an illustration of a user interface that provides the user with the purchase details, according to an exemplary embodiment.

FIG. 17 is an illustration of a mobile wallet home screen display for selecting the option to shop online, according to an exemplary embodiment.

FIG. 18 is an illustration of a user interface for providing the user with different categories for selection, according to an exemplary embodiment.

FIG. 19 is an illustration of a user interface that provides different subcategories from the broad categories selected in FIG. 18, according to an exemplary embodiment.

FIG. 20 is an illustration of a user interface that provides the user with a list of selectable products, according to an exemplary embodiment.

FIG. 21 is an illustration of a user interface that provides product detail information, according to an exemplary embodiment.

FIG. 22 is an illustration of a user interface that provides product purchase details, according to an exemplary embodiment.

DETAILED DESCRIPTION

Figure 1:
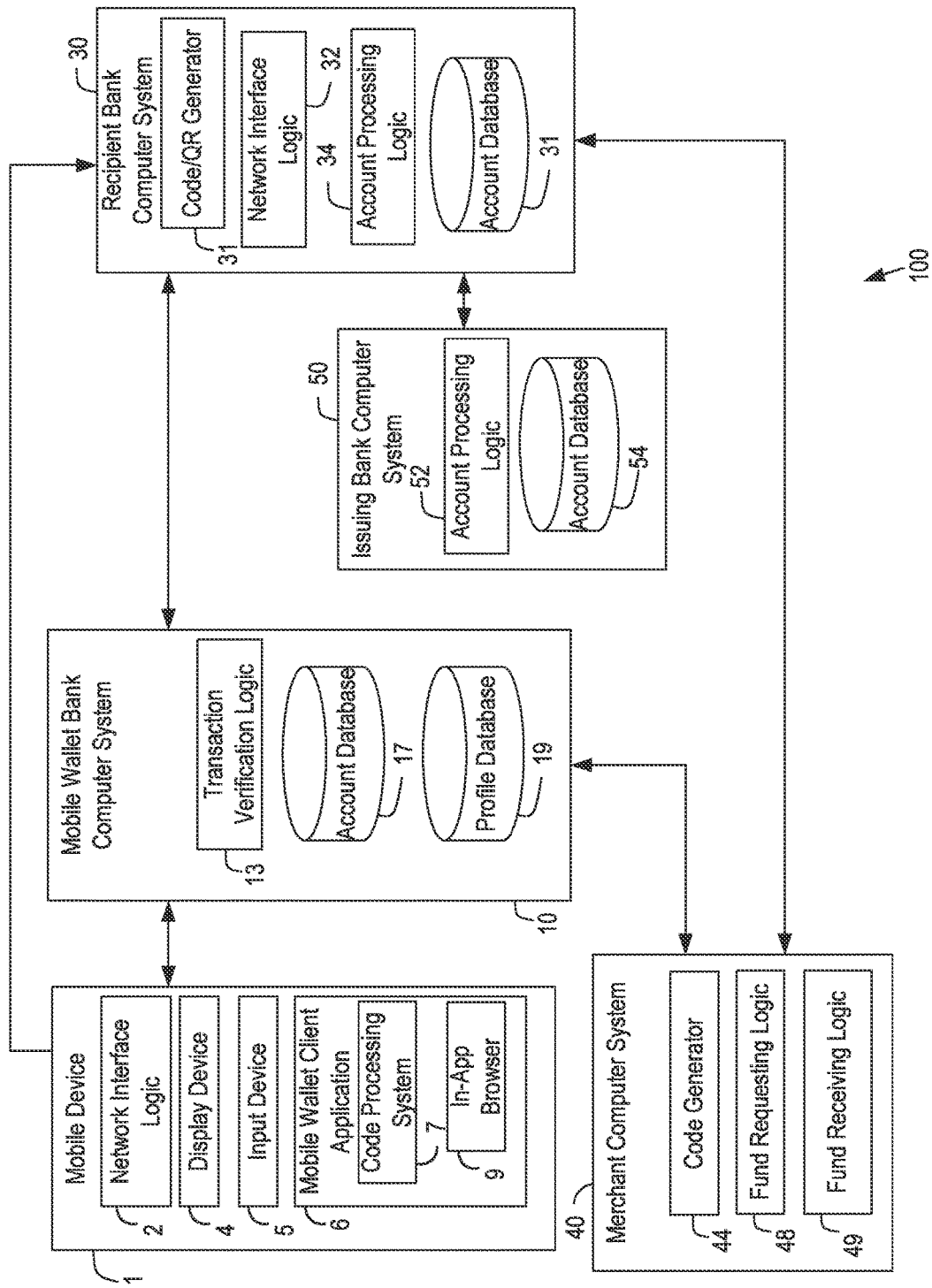
FIG. 1 is a schematic diagram of a computer-implemented payment processing system according to an example embodiment.

Referring to FIG. 1, a computer-implemented payment processing system 100 is shown that may be used to set up and utilize a mobile wallet account. The user of the mobile device 1 may be a business entity and/or an individual consumer that has one or more accounts with a financial institution. The accounts may include business or consumer demand deposit accounts, credit card accounts and so on. The mobile wallet account can be created for the user to transmit funds from a demand deposit account in return for purchase of goods or services to a merchant or a product provider. Additionally, the mobile wallet account may transfer funds from the user's account to another person or a merchant.

FIG. 1 is a schematic diagram of a computer-implemented payment processing system according to an example embodiment. In the example of FIG. 1, an interoperable mobile wallet platform is provided that may be accessed by consumers that bank at various different banking institutions and by merchants that bank at various different banking institutions. Hence, the mobile wallet client application 6 (or various branded variations thereof) may be offered through multiple banks and may utilize the services of multiple banks to complete transactions between the users and the merchants. Such an arrangement may promote broader adoption of the mobile banking platform by merchants and consumers.

Specifically, as shown in FIG. 1, a payment processing system 100 may include various computer systems such as a mobile device 1, mobile wallet bank computer system 10, recipient bank computer system 30 and merchant computer system 40. As will be appreciated, in practice, the computer system of a given banking institution may operate as the mobile wallet bank computer system in the context of some transactions and may operate as the recipient bank computer system in the context of other transactions. In other embodiments, the computer system of a given banking institution may operate as the mobile wallet bank computer system and the recipient bank compute system in a transaction.

In FIG. 1, the computer systems 1, 10, 30, 40 and 50 may communicate with each other to complete transactions. As shown in FIG. 1, the connection of mobile device 1 is such that it does not communicate directly with the recipient bank computer system 30. In other implementations, the mobile device 1 may be configured to communicate some information to the recipient bank computer system 30 and/or the merchant computer 40. Interconnections of the computer systems 1, 10, 30, 40 and 50 will now be briefly described.

The mobile device 1 may be used by an individual user (e.g., a business owner or employee, a consumer, and so on) to create and interact with a mobile wallet account. The mobile device 1 may, for example be, a handheld computer, a cellular phone, smart phone, mobile handheld wireless e-mail device, personal digital assistant, portable gaming devices, or other suitable device. The mobile device 1 comprises network interface logic 2, a display device 4, an input device 5, and a mobile wallet client application 6. Network interface logic 2 may include, for example, program logic that are stored on non-transitory storage media that connects the mobile device 1 to a network. As described in greater detail below, for example, the mobile device 1 may receive and display screens or content including account information, transaction instructions, and so on. In an example embodiment, such screens may be used to request username and password information. Such screens may also be used to prompt the user to provide information regarding the amount of the payment and which merchant or individual (e.g., name, address, phone number or e-mail, a selection of a recipient by the user from his memory or from by the user from the mobile device 1, and so on) is to receive the payment. Such screens are presented to the user via the display device 4. The input device 5 may be used to permit the user to initiate account access and to facilitate receiving requested information from the user. As will be appreciated, in addition to or instead of the mobile device 1, users may also be provided with the ability to access the payment processing system 100 using another type of computer (e.g., a desktop or laptop computer executing browser software) to perform the operations described herein as being performed by the mobile device 1.

The mobile wallet client application 6 may comprise program logic executable stored on a storage medium on the mobile device 1 to implement at least some or all of the functions described herein. As will be appreciated, the level of functionality that resides on the mobile device 1 as opposed to the banking computer system 30 may vary depending on the implementation. The client application 6 may be a web browser that is configured to receive and display mobile web pages (e.g. web pages prompting the user to provide information to create an account, web pages displaying account balance information and past transactions, and so on). The mobile wallet client application 6 may also include a code/token generator 8 capable of generating a unique code/token for each transaction. As described below, the unique code/token may then be transmitted by the mobile device 1 as part of a transaction to facilitate authentication of the transaction. As will be appreciated, the user may also use other devices (e.g., laptop or desktop computer system, not shown) to create and access account.

In some embodiments, the mobile wallet client application 6 may include an in-application browser 9. In various embodiments, the in-application browser 9 may be used to view the image or code of a product. The in-application browser 9 may provide the user the opportunity to select an item and transmit the details regarding the item to a mobile wallet bank computer system 10 in order to purchase the item from a merchant. The mobile wallet bank computer system 10 may receive information that identifies the product and transmit the received information to the merchant computer system 40. In other embodiments, the received information may not identify the product to other computer systems, but the information may be sent to the merchant computer system to determine the identity of the product. After receiving the information from the in-application browser 9, the merchant computer system 40 may return an image of the selected product with an updated price. In some embodiments, the request from the in-application browser 9 may be forwarded to a plurality of merchants and the lowest price for the product may be presented to the user. In other embodiments, the request from the in-application browser 9 may be forwarded to a third party system that has access to the price listing for various merchants. The third party system may determine the lowest price, or the third party system may determine the most reliable merchant (reliability determined based on other user input). The in-application browser 9 may receive the information from the third party system or the merchant computer system 40 and allow the user to choose the display order based on a selectable filter. From the in-application browser 9 the user may choose a merchant and instruct the mobile wallet bank computer system to send payment information with the order information to the merchant computer system 40 to transmit the funds from an account held by the user to the recipient bank computer system 30.

In FIG. 1, the mobile wallet application 1 is used in connection with merchant computer system 40 located at a brick and mortar store location. As previously indicated, however, the mobile wallet application 6 may also be used in connection with online merchant transactions. For example, in another embodiment, merchants may be provided with the ability to have a mobile storefront and profile within the mobile wallet application 6 and the in-application browser 9. For example, merchants may be provided with the ability to display marketing material, provide information, and promote products or discounts. Merchants may also be provided with the ability to sell items directly through their mobile storefront for the account holder to purchase from within the mobile application 6.

The mobile device 1 may include, in addition to the other features previously described, a code processing system 7. The code processing system 7 may include a code scanner (i.e. camera), and/or a code generator. In one embodiment, the code processing system 7 may receive a numerical code from the mobile wallet bank computer system 10 and generate an image that represents the received code on the display device 15. In some embodiments, the code processing system 7 may receive the code from the product.

The bank computer system 10 includes transaction verification logic 13, account database 17, and profile database 19. The transaction verification logic 13 may receive a transaction amount from the mobile device 1 or the merchant computer system 40 based on the merchant generated code that identifies the product. The transaction verification logic 13 may generate a message to send to the mobile device 1 to allow the user to verify and confirm the transaction amount. Upon receiving the verification message, the account holder via mobile device 1 may approve the transaction amount. The account holder may be shown an image of the chosen product in order to verify that the correct product's code was scanned.

The account database 17 may store details regarding financial institution accounts. In particular, the account database 17 may store each financial transaction that occurred. Each financial transaction may include the amount of the transaction and the merchant.

The profile database 19 may store other information regarding the account holder. For example, the profile database 19 may store information useful for generating offers and advertisements that are selected specifically for the account holder. In some embodiments, the recipient computer system 30 or the merchant computer system 40 may also be operative to process the transaction between the user and the merchant.

As shown in FIG. 1, the mobile wallet bank computer system 10 is configured to communicate with the mobile device 1. The content of the communication with the recipient bank computer 30 may include account information of the user, confirmation of the code and approval/declining a transaction between the user of the mobile device 1 and a merchant.

As shown in FIG. 1, the recipient bank computer system 30 is configured to communicate with one or more financial institutions that provide financial accounts to various individuals or merchants.

The recipient bank computer system 30 includes network interface logic 32, account processing logic 34, and accounts database 36. When the mobile wallet account is created, the user may be prompted to provide bank account information (e.g., routing number and/or account number) for the source account that is used as a source of funds for the mobile wallet account. Thus, the financial institution that provides the mobile wallet account for the user and the financial institution that typically provides banking services to the user may be two different financial institutions.

The merchant computer system 40 may be configured in generally the same manner as the other computer systems described herein. For example, if the fund recipient is an individual, the computer system 40 may be another mobile device, such as a handheld computer, cellular phone, smart phone, mobile handheld wireless e-mail device, personal digital assistant, portable gaming devices, or other suitable device. If the fund recipient is a merchant (e.g., a brick and mortar merchant, a retail website or other online merchant, etc.), the computer system 40 may comprise a point of sale (POS) device or other computer system (e.g., one or more servers each with one or more processors) configured to execute instructions, send and receive data stored in memory, and perform other operations to implement the operations described herein associated with the fund recipient.

The merchant computer system 40 may be used at a point of sale to conduct transaction with the account holder. As another example, the merchant computer system 40 may comprise a mobile computing device (e.g., smart phone, tablet PC, etc.) operated by a store clerk as the clerk moves throughout the store. Again, the mobile computing device in such an embodiment may connect to a central server system operated by the merchant. In some embodiments, the merchant computer system 40 may be remotely located and the mobile device 1 may communicate with the merchant computer system 40 such that the user may be able to purchase products at the physical store without interacting with a clerk. In various embodiments, the user may not want to wait in a line and after performing the transaction using their mobile device 1 the user may walk out of the store without interacting with an in-store purchase device. The user may scan the product code from each product, send the code to the merchant computer 40 and approve a fund transfer to the merchant. After the merchant receives the fund transfer approval message, the merchant may send a message to the mobile device 1 and inform the user to walk out of the store. For verification purposes and to avoid theft, a camera at the store location may verify that the number of products in the user's cart matches the number of items in the remote transaction. In another embodiment, store personnel may be placed at the exit to verify that the number of products in the user's possession matches the mobile device receipt that is generated for the transaction.

The merchant computer system 40 includes code generator 44, fund requesting logic 48, and fund receiving logic 49. The code generator may be configured to formulate a product code, such as but not limited to, optically scannable or non-optically scannable codes. Examples of optically scannable codes include bar codes, two dimensional codes (e.g. QR code and other similar codes), three dimensional codes (e.g. QR code with color and others characteristics), and four dimensional codes (e.g. QR code with color and timestamp information). Examples of non-optical codes include, near field communication (NFC), RFID, HID or other RF signal to transmit the code. Code generator 44 may include a light-emitting device that scans a code using infrared, laser, or other types of communication technology. In one embodiment, the code generator 44 may generate a QR code. The code generator 44 may encode various types of information that was incorporated into the QR code.

In another embodiment, the code generator 44 may generate a product code that is to be displayed on the product, street, public location, or website for the mobile device 1. The merchant may display the code for the account holder to scan. The code that is generated may include a merchant identifier and a barcode for the product. In other embodiments, the product code could include a date of expiration for the product. In some embodiments, the product code could include the geographic location of where the product was created. The mobile device 1 may scan the code directly from the product. In some embodiments, the mobile device 1 may take a picture of the code directly from the product that the user wants to purchase. The recipient's financial institution may receive the amended code from the mobile device to transfer funds from an account held by the account holder to the merchant.

The fund requesting logic 48 communicates a fund request to the recipient bank computer system 130. In one embodiment, the fund requesting logic 48 also sends the amount of transaction to a financial institution. In some embodiments, the fund requesting logic 48 may request funds from a mobile wallet device such as a mobile device 1.

As shown in FIG. 1, the recipient bank computer system 30 is configured to communicate with the mobile device 1, mobile wallet bank computer system 10, and merchant computer system 40, and issuing bank computer system 50. The recipient bank computer system 30 is configured to receive funds from the financial institution of the user (e.g. mobile wallet bank computer system 10).

As shown in FIG. 1, the merchant computer system 40 is configured to communicate with the mobile device 1, mobile wallet bank computer system 10, and recipient bank computer system 30. The merchant computer system 40 is configured to receive a code (e.g. QR code) and other information from the mobile wallet bank computer system 10 when the user scans the product code using the mobile device 1. The interface between the mobile wallet bank computer system 10, the recipient bank computer system 30 and the merchant computer system 40, uses bank level security encryption to send and receive messages.

As shown in FIG. 1, the issuing bank computer system 50 or the mobile wallet bank computer system 10 is operative to transfer funds from the demand deposit account or credit card held by the user to the recipient bank computer system 30 under the direction of the mobile wallet bank computer system 10 or the recipient bank computer system 30. The issuing bank computer system 50 may be configured to communicate via a network with the mobile wallet bank computer system 10 and the recipient bank computer system 30. The issuing bank computer system 50 is configured to receive funds from various mobile wallet bank computer systems 10 and transmit the funds to the appropriate recipient bank computer systems 30. The issuing bank computer system 50 may include an account processing logic 52 that determines which user has a credit card account and an account database that store information regarding user accounts.

As will appreciated, during operation of the system shown in FIG. 1, various parameters may be passed between the computer systems 1, 10, 30, 40 and 50. An exemplary listing of such parameters is set forth below in Table 1. These parameters may be alphanumeric values.

TABLE 1

| Term | Definition |
| --- | --- |
| Payment Identifier (PI) | A static value that is tied to an underlying payment type or consumer registry info. |
| Default ACN | Default actual card number. |
| Wallet User ID (WUI) | A unique ID for each user of each wallet. |
| Product Code (UPLC) | Unique Product Level Code may be a code that is assigned to a product by a merchant or manufacturer. The product code may include a merchant identifier and a product identifier. |

Figure 2:
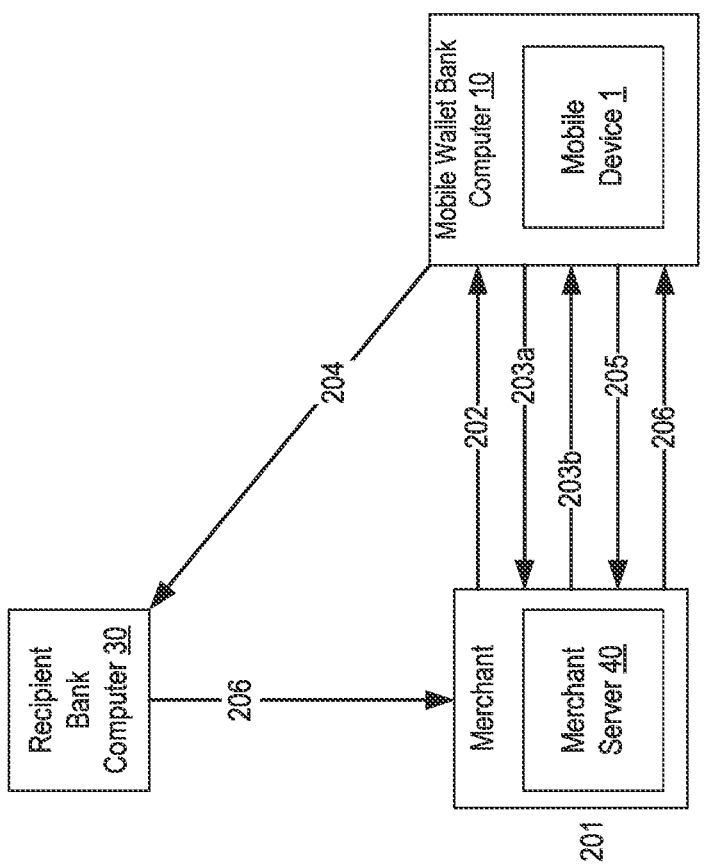
FIG. 2 is a process implemented by the payment processing system of FIG. 1.

FIG. 2 depicts a first process for completing a transaction that may be implemented by the payment processing system of FIG. 1. For purposes of providing an example, it is assumed that the two parties to the transaction in FIG. 2 are a user of mobile wallet application 6 (e.g., consumer) and a merchant. Again, as above, it will be appreciated that other types of transactions may be possible.

FIG. 2 illustrates a process implemented by the payment processing system of FIG. 1. In the embodiment shown in FIG. 2, the user may wish to purchase items at a store using their mobile wallet enable mobile device 1, instead of standing and waiting in a long line. Table 2 below describes the messages that are transmitted in various steps and the content of the messages from FIG. 2. Table 2 refers to an alpha wallet that represents the mobile wallet bank computer 10 and the mobile device 1 from FIG. 2. The beta issuer that is referred to in Table 2 may operate or signify the card issuer computer system 50 from FIG. 2. The recipient bank computer 30 shown in FIG. 2 is discussed in Table 2 as the gamma acquirer.

TABLE 2

| Step number - Step Name | Step Description | Msg Routing Info (TO) | Msg Routing Info (FROM) | Payload |
| --- | --- | --- | --- | --- |
| 201 - Merchant Generates a Unique Product Level Code (UPLC) associated with a specific product. | Merchant Generates a Unique Product Level Code (UPLC) associated with a specific product. This UPLC can be generated as a QR code or an alphanumeric string. The QR code can be presented via multiple channels: On a website, on a mobile website, on a billboard, on a television, in a catalog, in an aisle, in a direct mail piece or in a checklane. The Alphanumeric String can be presented via multiple channels: mobile website, on a billboard, on a television, in a catalog, in an aisle, in a direct mail piece or in a checklane or via a radio broadcast. User selects Payment Identifier associated with the underlying payment method. | N/A | N/A | N/A |
| 202 - A user that is currently authenticated to their mobile wallet or banking application, enters the UPLC into the phone. UPLC includes a merchant prefix and the barcode off the product. | This UPLC can enter the phone a number of different ways. It can be entered, scanned or 'listened to.' | n/a - via scan | n/a - via scan | UPLC |
| 203a - The Alpha Wallet, using the UPLC identifies the merchant and associated product that the consumer is interested in purchasing. | Once the Wallet receives the UPLC, it will then use a look up table to determine which merchant and product is associated with the UPLC. | | | UPLC |
| 203b - Merchant server sends the amount and the product details back to the alpha wallet. | The user of the alpha wallet. | Alpha Wallet | Merchant server | Amount, product details including image of the product and/or size |
| 204 - The Alpha Wallet will then conduct a Master Merchant eCommerce card transaction to pay the merchant. | The Alpha Wallet will then conduct a eCommerce card transaction to pay the merchant. The Alpha Wallet will use the UPLC to determine a Final Amount (final purchase amount), retrieves the user's default actual card number Default ACN, acts as master merchant to conduct the transaction and then will send the appropriate amount of money to the | | | UPLC PI Final Amount Default ACN Merchant DDA |

TABLE 2-continued

| Step number - Step Name | Step Description | Msg Routing Info (TO) | Msg Routing Info (FROM) | Payload |
|---|---|---|---|---|
| | merchant (Merchant DDA) The Wallet may use a Payment Identifier to retrieve the actual payment card info directly from the issuer if they do not have it on file. | | | |
| 205 - The Alpha Wallet will request the Merchant to ship the appropriate goods associated with the UPLC to the Alpha Wallet consumer's shipping address. | After successful payment has been achieved, the Alpha Wallet will send the order details and shipping info to the merchant. | | | Order Details Shipping Info/Address |
| 206 - The merchant, upon receiving payment, order details and shipping address; sends the appropriate goods to the alpha wallet consumer. | Goods may be shipped directly the Alpha Wallet consumer's home or place of business or be kept at the store for pickup. | n/a | n/a | Payment Order Info Shipping Info/Address |

Referring to FIG. 2, FIG. 2 includes mobile device 1, mobile wallet bank computer 10, recipient bank computer 30, and merchant computer 40. In FIG. 2, at step 201, a merchant may generate a unique product level code (UPLC) associated with a specific product. A merchant may generate a Unique Product Level Code (UPLC) associated with a specific product. This UPLC can be generated as a QR code or an alphanumeric string. The QR code can be presented via multiple channels: On a website, on a mobile website, on a billboard, on a television, in a catalog, in an aisle, in a direct mail piece or in a checklane. The Alphanumeric String can be presented via multiple channels: mobile website, on a billboard, on a television, in a catalog, in an aisle, in a direct mail piece or in a checklane or via a radio broadcast.

In some embodiments, at step 201, a merchant computer 40 may generate a unique product level code (UPLC) that is associated with a specific product. In various embodiments, the UPLC can be generated as a QR code or an alphanumeric string. The QR code can be presented via multiple channels: on a website, on a mobile website, on a billboard, on a television, in a catalog, in an aisle, in a direct mail piece or in a checklane. In various embodiments, the Alphanumeric String can be presented via multiple channels: mobile website, on a billboard, on a television, in a catalog, in an aisle, in a direct mail piece or in a checklane or via a radio broadcast. In other embodiments, the UPLC may represent a combination of a merchant identifier and a product identifier. In some embodiments, the merchant identifier portion of the product code may be added after the product identifier has been affixed to the product.

In some embodiments, at step 202, a user that is currently authenticated to their mobile wallet or banking application, enters the UPLC into the phone. The product code can be received by the mobile device 1 in a number of different ways (including an in-application browser). The product code can be received, by scan or verbally spoken, or typed in by the user. In some embodiments, the UPLC includes a merchant prefix and a barcode from the product.

In some embodiments, at step 203a, the mobile wallet computer system 10 identifies the merchant and associated product that the consumer is interested in purchasing. In various embodiments, the mobile wallet computer system 10 may access a lookup table. In other embodiments, the mobile wallet computer system 10 may use a lookup table to determine the merchant identifier and the merchant contact information. After determining the merchant contact information, the mobile wallet computer system 10 may send the product code to the merchant to identify the product, the product's price, any offers for the user and other information. In other embodiments, the mobile wallet bank computer 10 can use a look up table to determine which merchant or product is associated with the UPLC.

Next, at step 203b, the merchant computer 40 may send the amount and the product details back to the mobile wallet bank computer system 10 to be displayed on the mobile device 1 for the user to visually verify the correct product is being purchase. In an embodiment where the user is in the store, the user can compare the image with the product the user intends to purchase. In the embodiment where the user does not have the product, the user may verify the identity of the product by the image of the product. The product information may also include the size of the product.

Next at step 204, the mobile wallet bank computer 10 may conduct a master merchant eCommerce card transaction to pay the merchant. The mobile wallet bank computer 10 may then conduct an eCommerce card transaction to pay the merchant. In other embodiments, the mobile device 1 may use a portion of the product code to determine a final amount (final purchase amount), retrieve the user's default actual card number (a person's debit card or credit card number that they pre-set as the default payment account), act as master merchant to conduct the transaction, and then send the appropriate amount of money to the merchant (Merchant DDA or bank). The mobile wallet 1 may use a payment identifier to retrieve the actual payment card info directly from the issuer if the mobile wallet 1 does not have the information on file. In some embodiments, the information sent from the mobile wallet bank computer 10 may be tokenized for user protection.

Next, at step 205, the mobile wallet may request that the merchant ship the appropriate goods associated with the UPLC to the mobile wallet user's shipping address. After a successful payment has been achieved, the mobile wallet 1 may send the order details and shipping info to the merchant.

Next, at step 206, upon receiving the payment, order details and shipping address, the merchant may send the purchased goods to the mobile wallet user. Goods may be shipped directly to the mobile wallet user's home or place of business or be kept at the store for pickup.

In various embodiments, the payment processing may occur in different manner. In some embodiments, the mobile wallet bank acting as a master merchant may conduct the payment processing. In other embodiments, the payment processing may be conducted by the merchant bank as acting as a master merchant. In yet another example embodiment, the issuing bank may perform the payment processing.

In other embodiments, when a user is in a retail store and the user conducts a purchase transaction via the mobile wallet 1, the retail store may send a signal to the security tags attached to the products such that the security tags are deactivated after the purchase transaction without any retail personnel intervention. In another embodiment, after purchasing the product via the mobile device 1, another customer or the user of the mobile wallet 1 may not accidentally purchase the same product. In this example embodiment, the product code is deactivated or removed from the inventory upon the purchase of the product and other users are prevented prohibited from purchasing the same item that has already been purchased by a user.

In yet another embodiment, a user of the mobile wallet may decide that they wish to return a purchased good. An initial transaction to return the product may be performed by the user when the user is away from the retail location. In this example embodiment, the user may bring the product the retail store in order for the clerk to verify that the product is in a returnable condition. After verification by the store personnel, funds may be refunded back to the accounts of mobile wallet 1.

Figure 3:
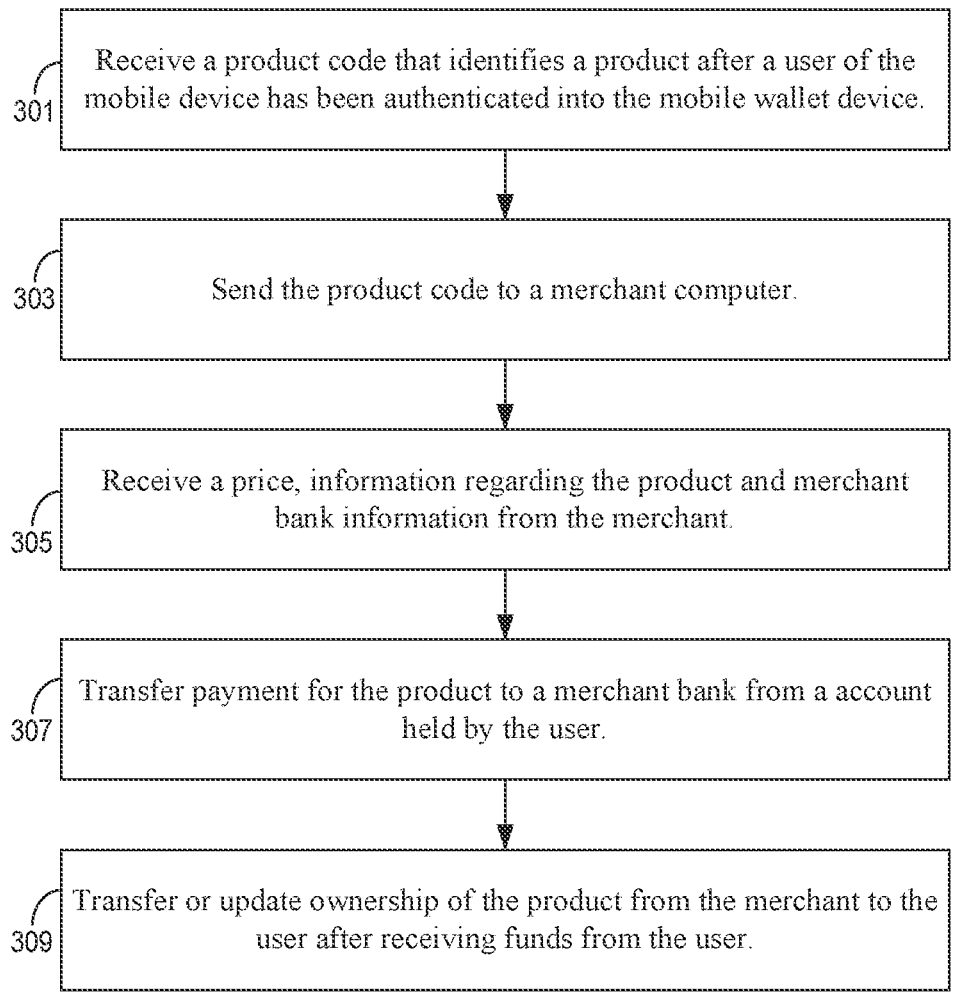
FIG. 3 is a process implemented by the payment processing system of FIG. 1.

Referring to FIG. 3, FIG. 3 is a process implemented by the payment processing system of FIG. 1. The process includes various steps such as but not limited to, steps 301-309. At step 301, the mobile device 1 may receive a product code that identifies a product (UPLC) after a user of the mobile device 1 has been authenticated into the mobile wallet. After receiving the UPLC, the mobile device 1 sends the product code to a merchant computer, at step 303. Next, at step 305, the mobile device 1 may receive a price, information regarding the product and merchant bank information from the merchant server 40. In various embodiments, at step 307, the mobile device 1 may transfer the payment for the product to a merchant bank from an account held by the user. After step 307, the merchant server 40 may transfer or update the ownership of the product from the merchant to the user at step 309. After the transfer or update of the ownership, the user may walk out of the store with the product without interacting with a cashier machine or cashier. In other embodiments, when the user is not in a store, the merchant may ship the product to the user.

Figure 4:
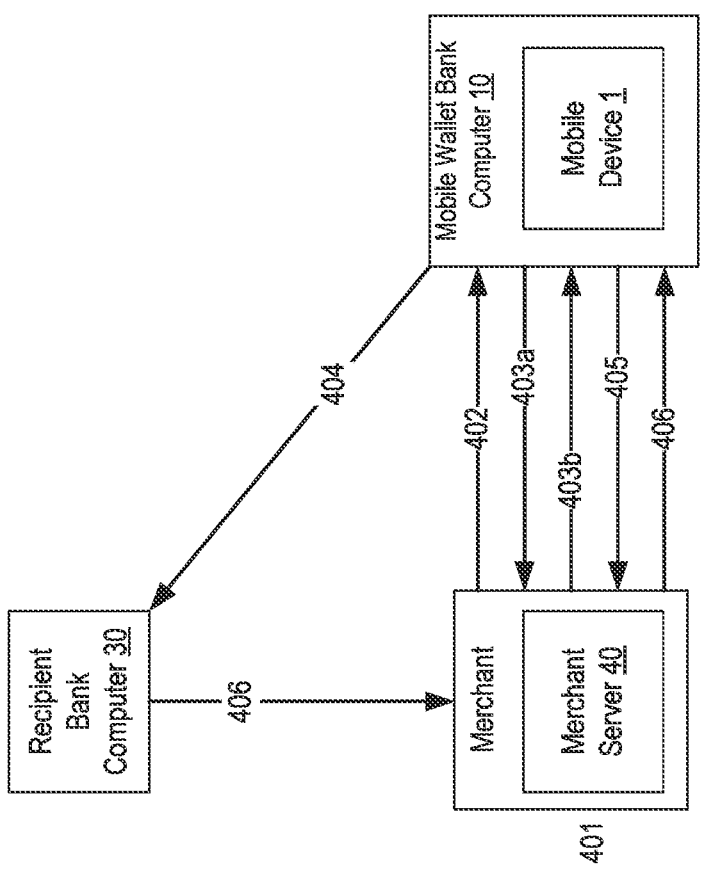
FIG. 4 is a process implemented by the payment processing system of FIG. 1.

Referring to FIG. 4, FIG. 4 includes mobile device 1, mobile wallet bank computer 10, recipient bank computer 30, and merchant computer 40. In FIG. 4, at step 401, a merchant 45 may generate a unique product level code (UPLC) associated with a specific product. This UPLC can be generated as a QR code or an alphanumeric string. The QR code can be presented via multiple channels: On a website, on a mobile website, on a billboard, on a television, in a catalog, in an aisle, in a direct mail piece or in a checklane. The Alphanumeric String can be presented via multiple channels: mobile website, on a billboard, on a television, in a catalog, in an aisle, in a direct mail piece or in a checklane or via a radio broadcast. In the embodiment shown in FIG. 4, the user of the mobile device 1 may use or be offered a coupon or a discount code. Steps 401-406 are similar to steps 201-206 described above. However, in various embodiments at step 403a the mobile wallet may transmit a mobile wallet identifier to the merchant server 40. Transmitting the mobile wallet identifier (or Wallet User ID (WUI)) may allow the merchant to determine whether the user of the mobile wallet is eligible for a discount or a coupon, in some embodiments. In various embodiments, the merchant determination regarding discounts or coupons may be based on the merchant reviewing the user's mobile wallet and/or non-mobile wallet activities with the merchant. Accordingly, the user may receive a larger discount or coupon based on the amount of funds the user of the mobile wallet identifier has spent with the merchant for a period of time (e.g. daily, daily average, monthly, quarterly, and yearly, etc.) In other embodiments, the discount or the coupon value may be determined based on the payment method used by the mobile wallet (e.g. credit cards (i.e. Amex, Discover, and so on offer discounts to user)).

In other embodiments, when the user does not have the product to be purchased, for example when the user is in a moving bus or a remote location, the user may scan the code and request that the product be shipped to the user's address. In other embodiments, when a user visits a museum or the like, the user may scan or purchase a plurality of products while inside the museum and located remotely from the gift shop. When the user is departing, the gift shop may have an assembly of all the products that the user purchased while the user was visiting remotely located exhibits or the like.

Figure 5:
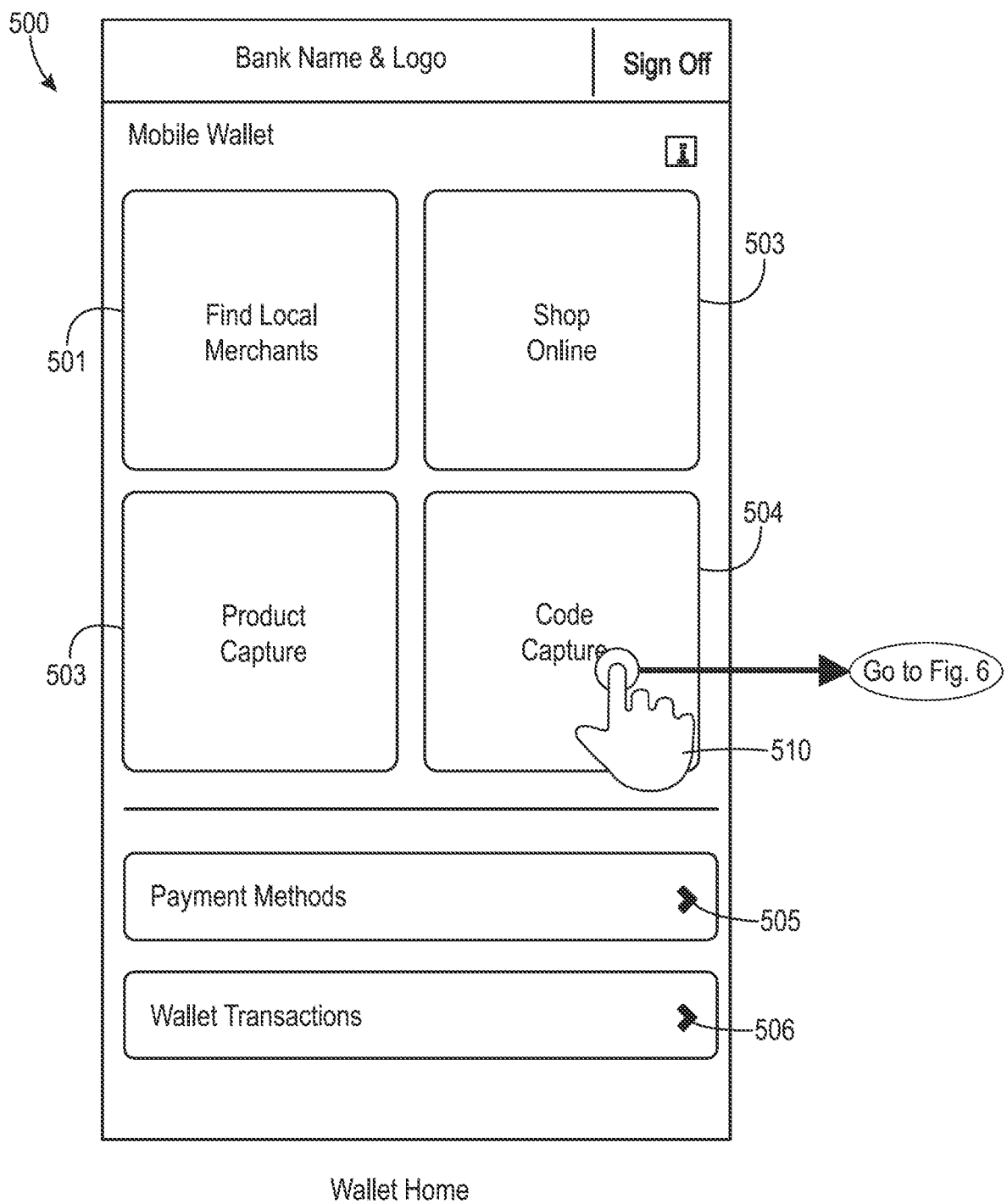
FIG. 5 is a screen display that may be displayed on a mobile wallet application of a mobile device, according to an exemplary embodiment.

FIG. 5 is an illustration of a mobile wallet screen display 500. The screen display 500 provides various options to the user of a mobile wallet client application 6, for example, find local merchants 501, shop online 502, product capture 503, and code capture 504. Each of the above options facilitates purchasing an item using the mobile wallet client application 6. The mobile wallet screen display 500 also provides additional options, such as, payment methods 505 and wallet transactions 506. Selection of payment methods 505 may generate a selectable list of user accounts with a positive balance. In some embodiments, the user may choose more than one account as a payment source. In other embodiment, the user may choose to split the purchase amount between one or more accounts by using a percentage of funds from each account. In the example shown in FIG. 5, the user has selected code capture 504 to capture a code (e.g. using an image capture device or a keyboard) as indicated by the touch input 510. Once the user code capture 504, the mobile wallet client application 6 will display screen 600 in FIG. 6.

Figure 6:
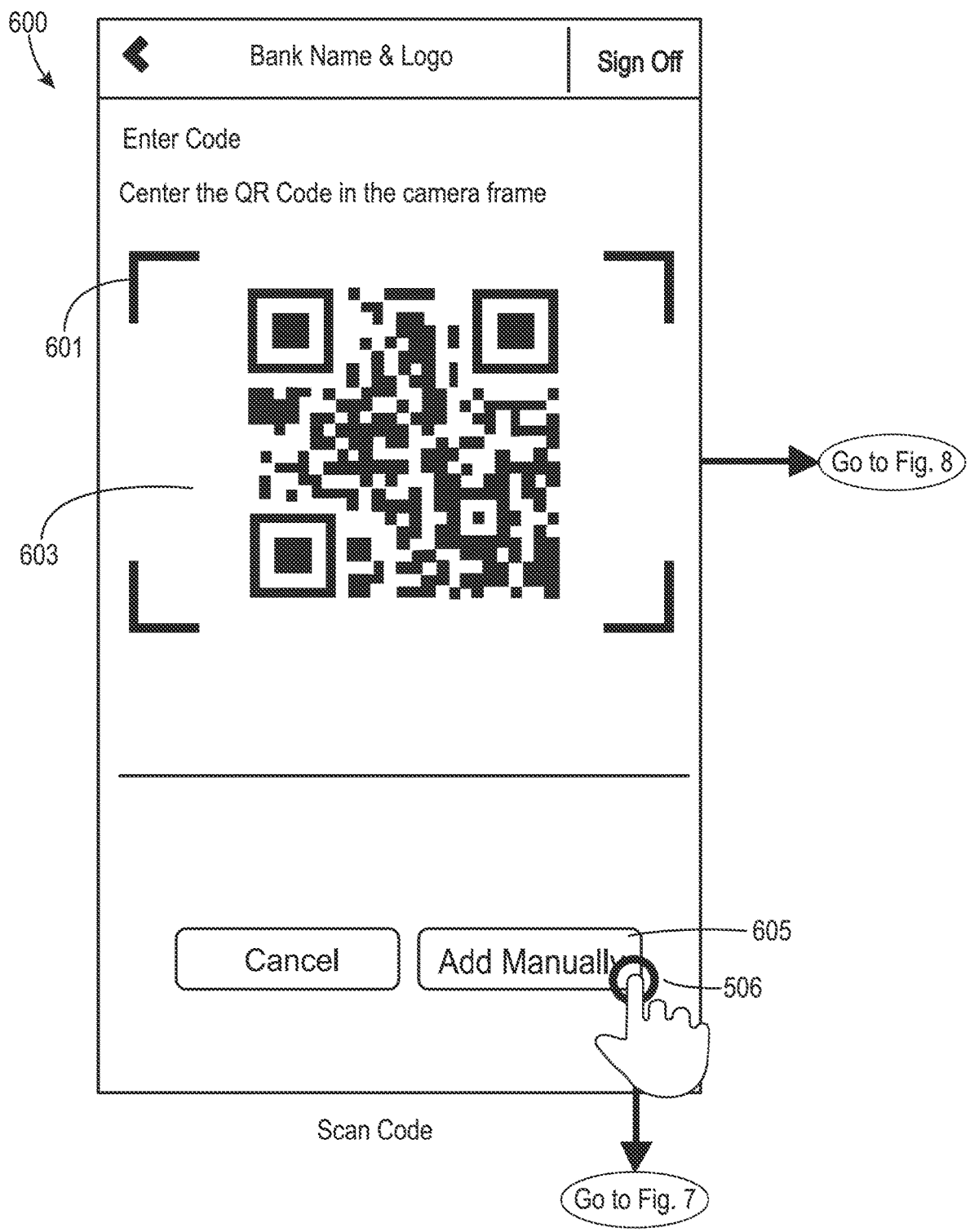
FIG. 6 is an illustration of a user interface that may allow the user to capture a product code, according to an exemplary embodiment.

FIG. 6 shows screen 600 that allows a user to use an image capture device on the mobile device to capture a product code 603 (e.g. QR code, barcode, RFID tag) displayed on a product or product packaging. In other embodiments, the product code 603 may be displayed on a computer screen, street sign, TV screen or the like. When the user is able to take the image of a product code, QR code, or barcode, then the user may be directed to screen 800 in FIG. 8. Alternatively, in another embodiment, the screen 600 offers the option to add or enter the product code manually by selecting the add manually button 605. Once the user selects the button 605, the user may be directed to the mobile wallet application display screen 700 in FIG. 7.

Figure 7:
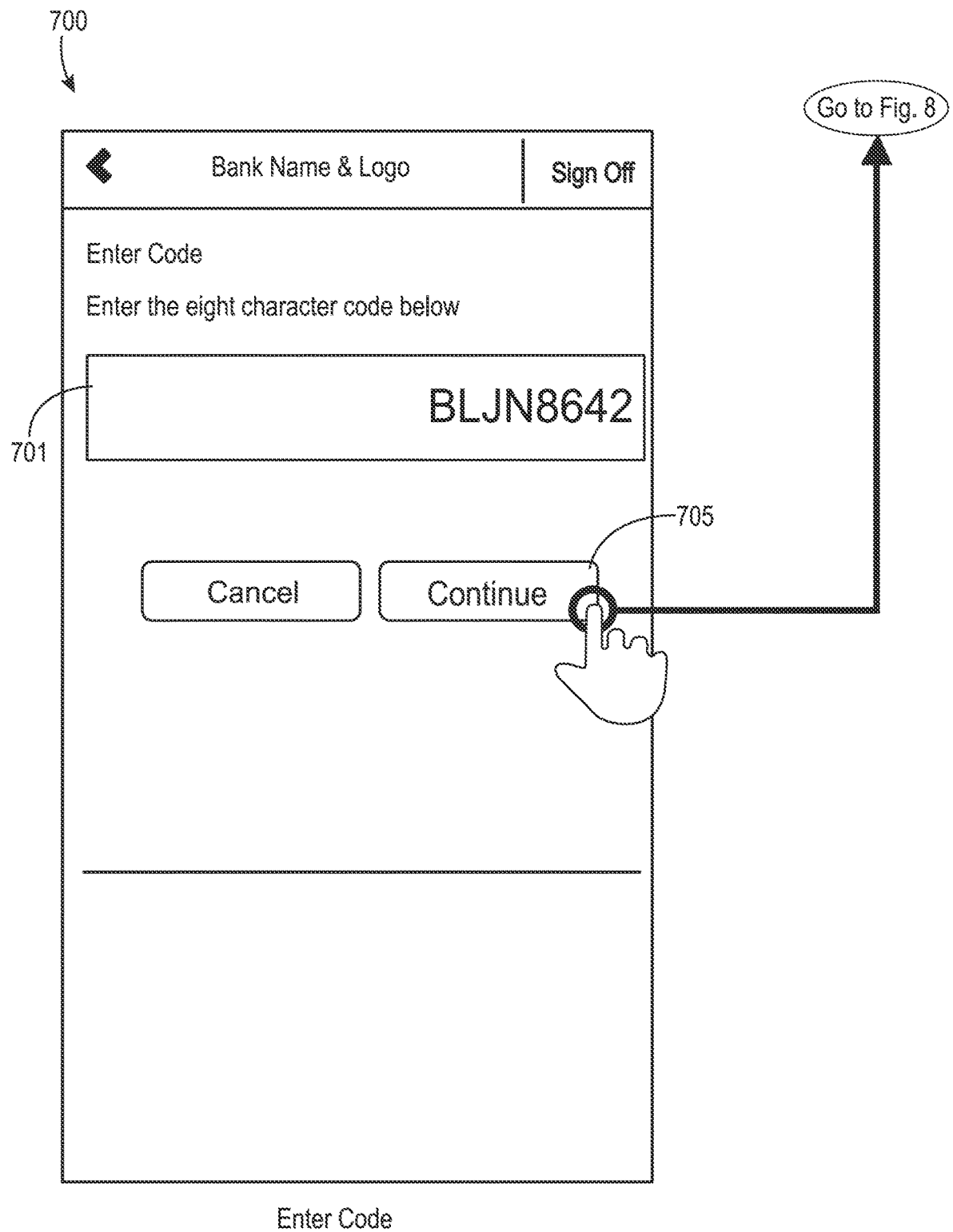
FIG. 7 is an illustration of a user interface that may allow the user to manually insert a product code, according to an exemplary embodiment.
Figure 8:
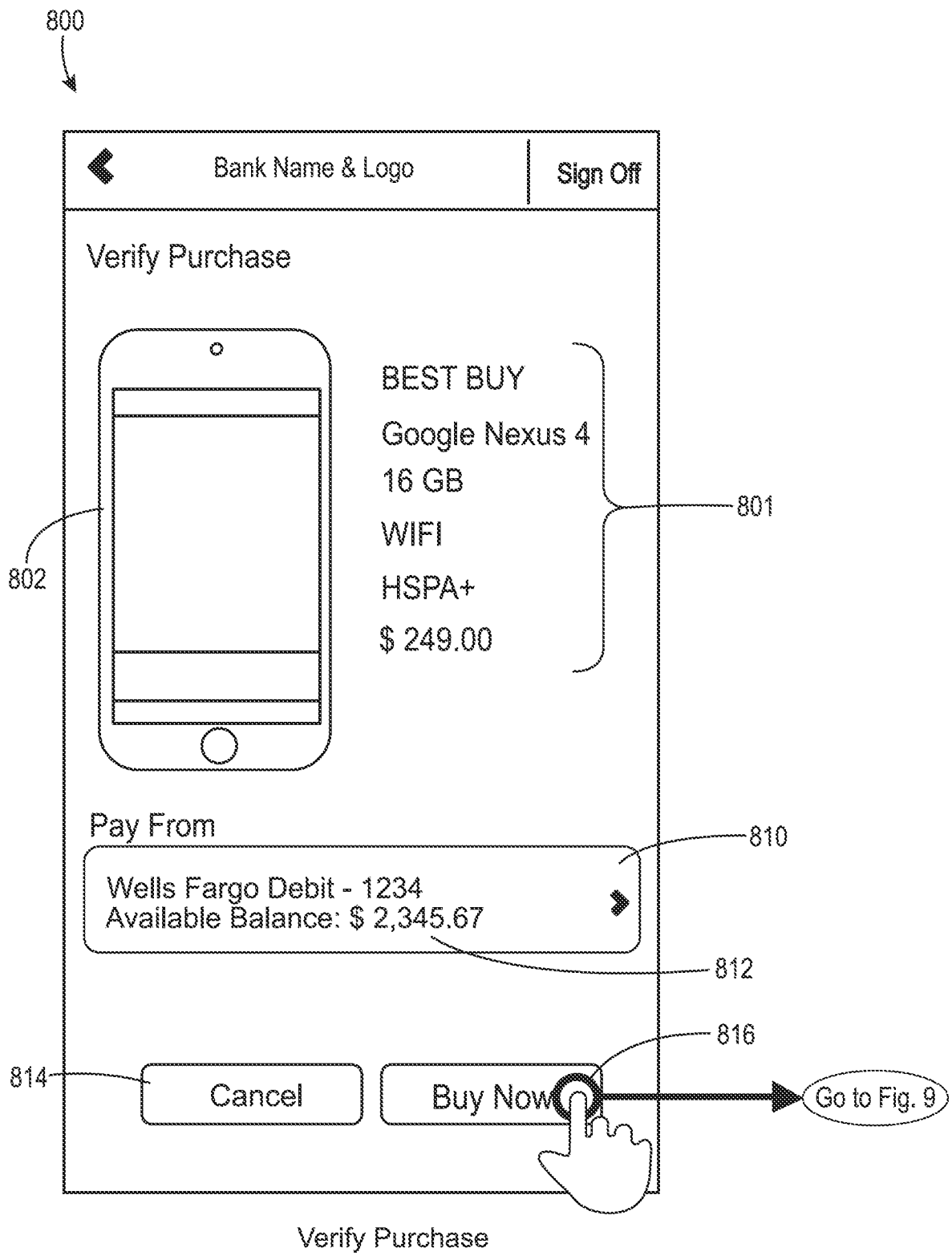
FIG. 8 is an illustration of a user interface that identifies the product related to the product code, QR code and/or the bar code entered in FIG. 6 and/or FIG. 7, accordingly to an exemplary embodiment.

In FIG. 7, the screen display 700 shows a data field 701 that allows the user to manually input a product code, using a keyboard on the mobile device. After inputting the product code, the user may select the continue button 705 in FIG. 7. Once the user chooses button 720 to continue the user may be directed to screen 800 in FIG. 8.

In some embodiments, After receiving the product code from screen display 600 or screen display 700, the mobile wallet client application 6 may send the received product code to a merchant computer system 40. The merchant computer system 40 may perform a server-based search or other type of search to determine the identity of the product that the user is interested in purchasing. The search system is configured to correlate the product code with the product associated with the code. The mobile wallet client application 6 may receive an image 802 of the product and information 801 regarding the product corresponding to the product code. The user may review the product image 802, as well as information 801 regarding the product and determine whether it is the desired product. If the information 801 and/or the image 802 are incorrect, the user may select the cancel option button 814. The cancel option button 814 may redirect the user back to the screen display 600 from FIG. 6 where the user may input a different product code. In other embodiments, if the image 802 and information 801 is correct, the user may select the payment method option from pull-down menu 810 which allows the user the option to select an account from which to pay for the purchase. In order to assist the user with their purchase options, the pull-down menu 810 may also display the available balance 812 for the selected account. Alternatively, if the user does not wish to purchase the product, the screen 800 also displays a cancel button 814, and the selection of the cancel button 814 will cancel the purchase transaction. Once the user selects to purchase the product using the buy now button 816, the user may be directed to screen 900 in FIG. 9.

In FIG. 9, the confirm purchase screen 900 may include the seller name 901, product name 902, payment price 903, account identifier 905 and ship to address 909. In the confirmation screen 900, a user has the option to review the purchase information. In one embodiment, a user may select the edit option 911 to select a different payment account. In other embodiments, a user may select the edit link 913 to select a different shipping address. In other embodiments, a user has the option to select the cancel button 915 that cancels the purchase. If the user selects the purchase button 910, the user may be directed to screen 1000 in FIG. 10.

In FIG. 10, the current confirmation screen 1000 may include a purchase confirmation or transaction code 1001, product name 902, purchase price 903, ship to address 909, product delivery date 1012, and a continue button 1020. In various embodiments, the delivery date may be determined based on the method of shipping selected, e.g. whether the product is shipped via expedited, ground, or air shipment. The user may then select the continue button 1020 to complete the transaction.

FIG. 11 is an illustration of a mobile wallet screen display 1100 that is similar to the screen display 500 from FIG. 5. The screen display 1100 provides various options that are similar to the options provided in FIG. 5. In the example shown in screen display 1100, the user has chosen the product capture button 1103 as indicated by the touch input 1105. Once the user selects product capture button 1103, the user may be directed to display screen 1200 in FIG. 12.

In FIG. 12, the user has the option to capture an image 1201 by using the camera of the mobile device 1. Once the user has taken a picture of the product (i.e. image 1201), the user may have select the cancel button 1202, or select the product image 1201 as indicated by the touch input 1203. Once the user selects the product image 1201, the user may be redirected to display screen 1300 in FIG. 13.

The mobile wallet client application 6 may send the image to an image search engine to identify which product is displayed in the image 1201. Additionally, the mobile wallet application may utilize the geolocation function of the mobile device 1 to determine the same or similar products for sale in a specified proximity located near the user. In an alternative embodiment, the user may manually specify a geolocation in which to locate the product or similar products for sale.

In FIG. 13, the product identifier 1301 may indicate the available quantity and type of product identified from the product image 1201. The product confirmation prompt 1302 requests that the user confirm the product identified in the product identifier 1301 is the product of interest. If the user is not interest in the identified product, then the user may select the retake photo button 1303 and the user will be redirected to screen display 1200 to retake the product image. When the identified product is the desired product, the user may select the confirm photograph button 1304 as indicated by the touch input 1305. The user may then be redirected to display screen 1400 in FIG. 14.

In FIG. 14, the product price comparison screen 1400 may include the product identification 1401 and seller comparison options 1402. The server-based search or other type of search utilized may determine the product identification 1401. In other embodiments, the products may be displayed in expanded form based upon a desired price range or other search parameter. Once the user has determined which of the seller comparison options 1402 to review, the user may select the individual seller as indicated by the touch input 1403. The user may be directed to screen 1500 in FIG. 15 after receiving the user selection.

In FIG. 15, the screen 1500 may identify the specified product identification 1501, seller price 1502, as well as several purchase options 1503. The purchase options 1503 may include one or more of the following options: interior color, exterior color, safety package, mileage, exterior damage, stereo system, sunroof options, etc. Once the user has reviewed screen 1500, the user has the option to cancel purchase 1504, return to previous screen 1507 and select alternate seller comparison options 1402, or select the buy now option 1505. If the user selects the buy now 1505 option, the user may be directed to screen 1600 in FIG. 16. In various embodiments, once the user selects the buy now option 1505, the user may prompted to indicate which account to use to complete the purchase.

In FIG. 16, the display screen 1600 may include a purchase confirmation or transaction code 1601, product name 1602, purchase price 1603, pickup from address 1604, product available date 1605, and a continue button 1606. In other embodiments, the user may have the option to modify the pick-up address 1604, as well as the available date 1605. The user may then select the continue button 1606 to complete the transaction.

FIG. 17 is an illustration of a mobile wallet screen display 1700 that is similar to the screen displays 500 and 1100. The screen display 1700 provides various options that are similar to the options provided in FIGS. 5 and 11. In the example shown in screen display 1700, the user has chosen the shop online 1702 as indicated by the touch input 1705. Once the user selects the shop online button 1705, the user may be directed to display screen 1800 in FIG. 18.

FIG. 18 is an illustration of a mobile wallet screen display 1800 that displays a plurality of categories 1805. In the example shown in screen display 1800, the user may select a category 1810 (i.e. movies, music & books) by using touch input 1815. After receiving the touch input 1815 the mobile device 1 may display screen 1900 from FIG. 19.

Referring to FIG. 19, FIG. 19 is an illustration of a mobile wallet screen display 1900 that displays a plurality of subcategories 1905. As shown in display screen 1900, the user may select from a plurality of subcategories 1905. In the example shown in screen display 1900 the user may select new release 1907 by using the touch input 1910. After receiving the user selection, the mobile wallet client application 6 may generate display screen 2000.

Figures 20, 21, 22:
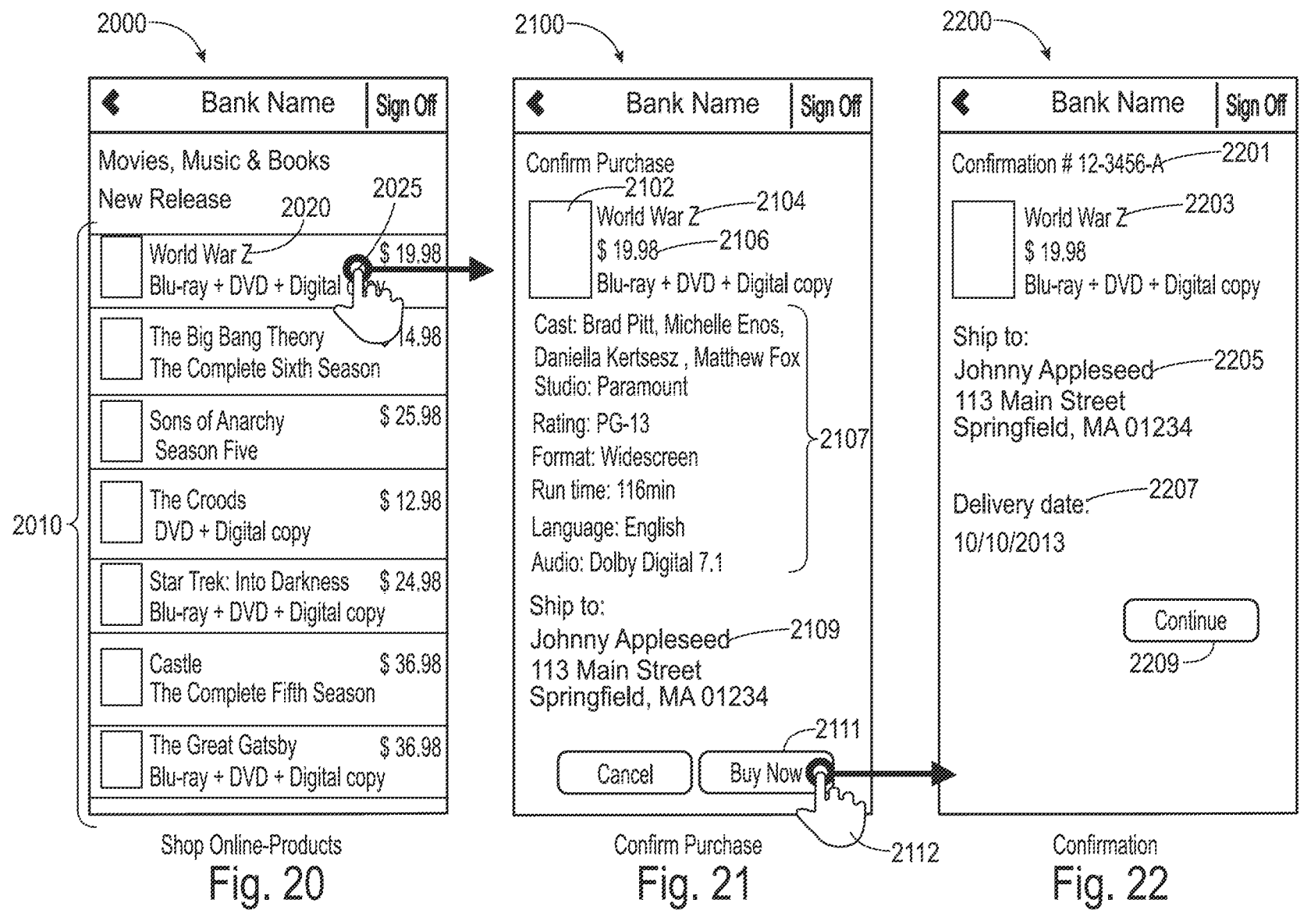

Referring to FIG. 20, FIG. 20 is an illustration of a mobile wallet screen display 2000 that displays a plurality of products 2010. As shown in display screen 2000, the user may select from a plurality of products 2010. In the example shown in screen display 2000 the user may select a movie 2020 by using the touch input 2025. After receiving the user selection, the mobile wallet client application 6 may generate display screen 2100 in FIG. 21. FIG. 21 displays the confirm purchase screen 2100. The confirm purchase screen 2100 includes details regarding the selected product includes a product image 2102. The screen display 2100 includes, a product image 2102, name of the product 2104, price 2106, information 2107 regarding the product, ship to address 2109, buy now button 2111. When the user selects the buy now button 2111 by using the touch input 2112, the user may be direct to screen display 2200 in FIG. 22.

FIG. 22 shows a confirmation screen display 2200 that includes a confirmation number 2201, product information 2203, shipping address 2205, and the projected delivery date 2207. Once the user chooses button 2209 to continue the purchase is completed.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
causing a first interface to be displayed by a mobile device, wherein the first interface comprises a first selection option;
causing a second interface to be displayed by the mobile device in response to receiving a first user selection of the first selection option via the first interface, wherein the second interface displays an image capture interface;
receiving an image from the mobile device based on receiving a second user selection of an image capture function element displayed on the second interface and a subsequent capturing of the image by the mobile device, the image comprising a code;
determining a product associated with the code;
receiving a third user selection of the product and a product purchase option associated with the product;
in response to receiving the product purchase option, transferring a payment for the product to a merchant associated with the product from an account based on information associated with the merchant and the product purchase option; and
causing a third interface to be displayed by the mobile device, the third interface comprising a purchase confirmation comprising order details including the product and the product purchase option.

2. The method of claim 1, further comprising:
receiving a location of the mobile device via a geolocation function of the mobile device; and
determining an available quantity of the product for sale within a predetermined distance of the location of the mobile device.

3. The method of claim 1, wherein the code comprises at least one of a merchant identifier or a product identifier, and wherein the product identifier is configured to indicate an available quantity of the product.

4. The method of claim 3, further comprising:
correlating the code with the product of the merchant based on the merchant identifier or the product identifier.

5. The method of claim 1, further comprising:
in response to transferring the payment, scheduling a shipment of the product from the merchant to an address associated with the account, the scheduling comprising sending the order details of the payment and shipping information to the merchant.

6. The method of claim 1, wherein transferring the payment further comprises:
retrieving payment information from the mobile device;
converting the payment information into tokenized payment information; and
providing the tokenized payment information to the merchant.

7. The method of claim 1, wherein the code is unique for each individual product such that the code of the product is different than the code for other similar products.

8. The method of claim 1, further comprising:
using a geolocation function of the mobile device to determine to a similar product for sale in a predefined distance of the mobile device.

9. A system comprising:
at least one processing circuit having a processor coupled to machine readable storage media having instructions stored therein that, when executed by the processor, cause the at least one processing circuit to:
cause a first interface to be displayed by a mobile device, the first interface comprising a first selection option;
cause a second interface to be displayed by the mobile device in response to receiving a first user section of the first selection option via the first interface, the second interface comprising an image capture interface;
receive an image from the mobile device based on receiving a second user selection of an image capture function element displayed on the image capture interface and a subsequent capturing of the image by the mobile device, the image comprising a code;
determine a product associated with the code;
receive a third user selection of the product and a product purchase option associated with the product;

in response to receiving the product purchase option, transfer a payment for the product to a merchant associated with the product from an account based on the product purchase option; and cause a third interface to be displayed by the mobile device, the third interface comprising a purchase confirmation comprising order details regarding the product.

10. The system of claim 9, wherein the instructions further cause the at least one processing circuit to:

receive a location of the mobile device via a geolocation function of the mobile device; and determine an available quantity of the product for sale within a predetermined distance of the location of the mobile device.

11. The system of claim 9, wherein the code comprises at least one of a merchant identifier or a product identifier, and wherein the product identifier is configured to indicate an available quantity of the product.

12. The system of claim 11, wherein the instructions further cause the at least one processing circuit to:

correlate the code with the product of the merchant based on the merchant identifier or the product identifier.

13. The system of claim 9, wherein the instructions further cause the at least one processing circuit to:

in response to transferring the payment, schedule a shipment of the product from the merchant to an address associated with the account, the scheduling comprising sending the order details of the payment and shipping information to the merchant, wherein the order details further comprise a product purchase price, and wherein the shipping information comprises the address.

14. The system of claim 13, wherein sending the purchase confirmation further comprises sending the shipping information.

15. The system of claim 9, wherein the code is a quick response (QR) code.

16. The system of claim 9, wherein the instructions further cause the at least one processing circuit to:

retrieve payment information from the mobile device;

convert the payment information into tokenized payment information; and provide the tokenized payment information to the merchant.

17. A non-transitory computer-readable storage media having instructions stored thereon that, when executed by at least one processor, cause the at least one processor to perform operations comprising:

causing a first interface to be displayed by a mobile device, the first interface comprising a first selection option;

causing a second interface to be displayed by the mobile device in response to receiving a first user section of the first selection option via the first interface, the second interface comprising an image capture interface;

receiving an image from the mobile device based on receiving a second user selection of an image capture function element displayed on the image capture interface and a subsequent capturing of the image by the mobile device, the image comprising a code;

determining a product associated with the code;

receiving a third user selection of the product and a product purchase option associated with the product;

in response to receiving the product purchase option, transferring a payment for the product to a merchant associated with the product from an account based on the product purchase option; and causing a third interface to be displayed by the mobile device, the third interface comprising a purchase confirmation comprising order details including the product and the product purchase option.

18. The non-transitory computer-readable storage media of claim 17, wherein the instructions further cause the at least one processor to perform operations comprising:

receiving a location of the mobile device via a geolocation function of the mobile device; and determining an available quantity of the product for sale within a predetermined distance of the location of the mobile device.

19. The non-transitory computer-readable storage media of claim 17, wherein the instructions further cause the at least one processor to perform operations comprising:

in response to transferring the payment, scheduling a shipment of the product from the merchant to an address associated with the account.

20. The non-transitory computer-readable storage media of claim 17, wherein the code comprises at least one of a merchant identifier or a product identifier, wherein the product identifier is configured to indicate an available quantity of the product, and wherein sending the purchase confirmation further comprises sending shipping information.

* * * * *